United States Patent
Chiu (10) Patent No.: US 11,379,206 B2
(45) Date of Patent: Jul. 5, 2022

(54) APP PUSHING METHOD AND DEVICE, ELECTRONIC DEVICE AND COMPUTER-READABLE STORAGE MEDIUM

(71) Applicant: SUZHOU DAJIAYING INFORMATION TECHNOLOGY CO., LTD., Jiangsu (CN)

(72) Inventor: Chun-wei Chiu, Jiangsu (CN)

(73) Assignee: SUZHOU DAJIAYING INFORMATION TECHNOLOGY CO., LTD., Jiangsu (CN)

( * ) Notice: Subject to any disclaimer, the term of this patent is extended or adjusted under 35 U.S.C. 154(b) by 23 days.

(21) Appl. No.: 16/763,310

(22) PCT Filed: Nov. 6, 2018

(86) PCT No.: PCT/CN2018/114108
§ 371 (c)(1),
(2) Date: Jul. 13, 2020

(87) PCT Pub. No.: WO2019/091367
PCT Pub. Date: May 16, 2019

(65) Prior Publication Data
US 2021/0182043 A1     Jun. 17, 2021

(30) Foreign Application Priority Data
Nov. 13, 2017    (CN) .......................... 201711111926.8

(51) Int. Cl.
*G06F 8/61*       (2018.01)
*H04L 67/55*     (2022.01)
*H04L 67/00*     (2022.01)

(52) U.S. Cl.
CPC ................ *G06F 8/61* (2013.01); *H04L 67/26* (2013.01); *H04L 67/34* (2013.01)

(58) Field of Classification Search
CPC ... G06Q 50/01; H04L 67/306; H04L 61/1594; H04L 61/605; H04L 67/36; H04L 67/24; G06F 8/61
See application file for complete search history.

(56) References Cited

U.S. PATENT DOCUMENTS

| 2003/0045272 | A1* | 3/2003 | Burr | ........................ | H04L 67/04 |
| | | | | | 455/411 |
| 2010/0057732 | A1* | 3/2010 | O'Sullivan | ............. | H04L 51/28 |
| | | | | | 707/E17.109 |

(Continued)

FOREIGN PATENT DOCUMENTS

| CN | 103886103 | 6/2014 |
| CN | 104615608 | 5/2015 |

(Continued)

OTHER PUBLICATIONS

International Search Report issued in PCT/CN2018/114108 dated Jan. 30, 2019.

*Primary Examiner* — S. Sough
*Assistant Examiner* — Cheneca Smith
(74) *Attorney, Agent, or Firm* — Workman Nydegger (57) ABSTRACT

Discloses are an APP pushing method and a computer-readable storage medium. Information of address book of each of a plurality of user terminals installed with a preset APP is obtained. All identical communication numbers present in detected address books of the plurality of user terminals are obtained. An intimacy set between a friend user corresponding to each identical communication number and terminal users corresponding to the plurality of user terminals is obtained according to interaction data between the friend user and the terminal users. At least one intimacy set with a number of close relationships matching a predetermined relationship being greater than a threshold is extracted from all intimacy sets. At least one of the preset (Continued)

APP and related information of the preset APP is pushed to the corresponding user terminal of the friend user corresponding to each intimacy set in the extracted at least one intimacy set.

20 Claims, 4 Drawing Sheets

(56) References Cited

U.S. PATENT DOCUMENTS

| | | | |
|---|---|---|---|
| 2012/0072283 A1* | 3/2012 | DeVore | G06Q 30/0251 705/14.49 |
| 2014/0324856 A1 | 10/2014 | Lahiani et al. | |
| 2015/0106367 A1* | 4/2015 | Cook | G06F 16/951 707/732 |
| 2015/0127731 A1* | 5/2015 | Hamada | H04L 29/08 709/204 |
| 2017/0262825 A1 | 9/2017 | Conway et al. | |

FOREIGN PATENT DOCUMENTS

| | | |
|---|---|---|
| CN | 105975537 | 9/2016 |
| CN | 106027633 | 10/2016 |
| CN | 106686198 | 5/2017 |
| CN | 106874308 | 6/2017 |
| CN | 107948255 | 4/2018 |

* cited by examiner

FIG. 1

Depending on an area range within which the plurality of user terminals are currently located, extracting from all identical communication numbers a communication number matching the area range — 2010

Pushing the preset APP and/or related information of the preset APP to the user terminal corresponding to the communication number matching the area range — 2020

APP PUSHING METHOD AND DEVICE, ELECTRONIC DEVICE AND COMPUTER-READABLE STORAGE MEDIUM

CROSS-REFERENCE TO RELATED APPLICATIONS

The present disclosure is a United States national stage application of co-pending International Patent Application Number PCT/CN2018/114108, filed on Dec. 6, 2018, which claims the benefit of Chinese patent application No. 201711111926.8, filed on Nov. 13, 2017, the disclosures of which are incorporated herein by reference in their entireties.

TECHNICAL FIELD

The present disclosure relates to the technical field of data processing, for example, to an APP (application) pushing method and device, an electronic device, and a computer-readable storage medium.

BACKGROUND

With the rapid development of electronic technology, more and more Applications (APPs) are installed in user terminals such as smart phones and smart televisions, so as to facilitating users in handling things, such as things in work and life. With a large number of APPs, people are able to process things anytime, anywhere, improving the efficiency of handling things.

When a user wants to use an APP, generally he would actively search for the APP on an APP application platform. However, there is a big chance that the APP the user actively found on the APP application platform is not the APP the user desires, hence the problem of low APP pushing accuracy.

SUMMARY

The present disclosure provides an APP pushing method and a computer-readable storage medium, effectively improving the APP pushing accuracy.

The present disclosure provides an APP pushing method, including:

obtaining, from a plurality of user terminals installed with a preset APP, information of address book of each of the plurality of user terminals;

detecting whether there is an identical communication number in the address book of each of the plurality of user terminals;

in response to detecting that there is an identical communication number in each of the plurality of user terminals, obtaining all identical communication numbers present in the detected address books of the plurality of user terminals;

obtaining an intimacy set between a friend user corresponding to each of the identical communication numbers and terminal users corresponding to the plurality of user terminals, according to interaction data between the friend user and the plurality of terminal users;

extracting, from all intimacy sets, at least one intimacy set with a number of close relationships matching a predetermined relationship being greater than a threshold; and pushing at least one selected from the group consisting of the preset APP and related information of the preset APP to the corresponding user terminal of the friend user corresponding to each intimacy set in the extracted at least one intimacy set.

In an embodiment, the operation of "obtaining an intimacy set between each friend user corresponding to each of the identical communication numbers and terminal users corresponding to the plurality of user terminals, according to interaction data between the friend user and the plurality of terminal users" includes:

determining the intimacy set between each friend user corresponding to each of the identical communication numbers and the plurality of terminal users, based on interaction contents in the interaction data between the friend user and the plurality of terminal users.

In an embodiment, the operation of "extracting, from all intimacy sets, at least one intimacy set with a number of close relationships matching a predetermined relationship being greater than a threshold" includes:

detecting whether the number of close relationships in each intimacy set matching the predetermined relationship is greater than the threshold to obtain a detection result; and extracting from all intimacy sets at least one intimacy set with the number of close relationships matching the predetermined relationship being greater than the threshold according to the detection result.

In an embodiment, the preset APP installed in each of the plurality of user terminals satisfies at least one selected from the group consisting of the following conditions: a frequency of use of the preset APP installed in each of the plurality of user terminals is not less than a preset frequency, and a latest time of use of the preset APP installed in each of the plurality of user terminals is within a set time range.

In an embodiment, the APP pushing method further includes the following operations subsequent to "obtaining all identical communication numbers present in the detected address books of the plurality of user terminals":

depending on an area range within which the plurality of user terminals are currently located, extracting from all identical communication numbers a communication number matching the area range; and pushing the preset APP and related information of the preset APP to the user terminal corresponding to the communication number matching the area range.

In an embodiment, the operation of "depending on an area range within which the plurality of user terminals are currently located, extracting from all identical communication numbers a communication number matching the area range" includes:

depending on a plurality of areas where the obtained plurality of user terminals are currently individually located, determining the area range within which the plurality of user terminals are currently located; and extracting from all the identical communication numbers the communication number matching the area range.

In an embodiment, the operation of "depending on a plurality of areas where the obtained plurality of user terminals are individually currently located, determining the area range within which the plurality of user terminals are currently located" includes:

linking the plurality of areas where the obtained plurality of user terminals are currently individually located to obtain a linked area;

modifying the linked area based on the linked area and city distribution data; and using the modified linked area as the area range within which the plurality of user terminals are currently located.

The present disclosure further provides an APP pushing device, including:

an information obtaining module, used to obtain information of address book of each user terminal from a plurality of user terminals installed with a preset APP;

a number detecting module, used to detect whether there is an identical communication number in the address book of each of the plurality of user terminals;

a number obtaining module, used to obtain all identical communication numbers present in the detected address books of the plurality of user terminals in response to detecting that there is an identical communication number in each of the plurality of user terminals;

a set obtaining module, used to obtain an intimacy set between a friend user corresponding to each of the identical communication numbers and terminal uses corresponding to the plurality of terminal users, according to interaction data between the friend user and the plurality of terminal users;

a set extracting module, used to extract from all intimacy sets at least one intimacy set with a number of close relationships matching a predetermined relationship being greater than a threshold; and an information sending module, used to push at least one selected from the group consisting of the preset APP and related information of the preset APP to the corresponding user terminal of the friend user corresponding to each intimacy set in the extracted at least one intimacy set.

The present disclosure further provides an electronic device, including at least one processor; a memory, configured to store at least a program;

when executed by the at least one processor, the at least one program causes the at least one processor to perform the APP pushing method described above.

The present disclosure further provides a computer-readable storage medium configured to store computer-executable programs for executing the above-described APP pushing method when executed by the processor.

On the basis that the probability that users corresponding to all identical communication numbers across the plurality of user terminals belong to the same type of users as the corresponding users of the plurality of user terminals is largely increased, the technical solution provided by the present disclosure selects out the friend users better matching the preset APP based on close relationships, and then pushes the related information of the preset APP. Thus, the preset APP and/or related information of the preset APP may be pushed to the user terminal having a higher matching degree with the preset APP, thereby effectively improving the accuracy of pushing the preset APP and the related information of the preset APP.

DETAILED DESCRIPTION

The present disclosure provides an APP pushing method and device, an electronic device and a computer-readable storage medium, which are able to effectively improve APP pushing accuracy.

Figure 1:
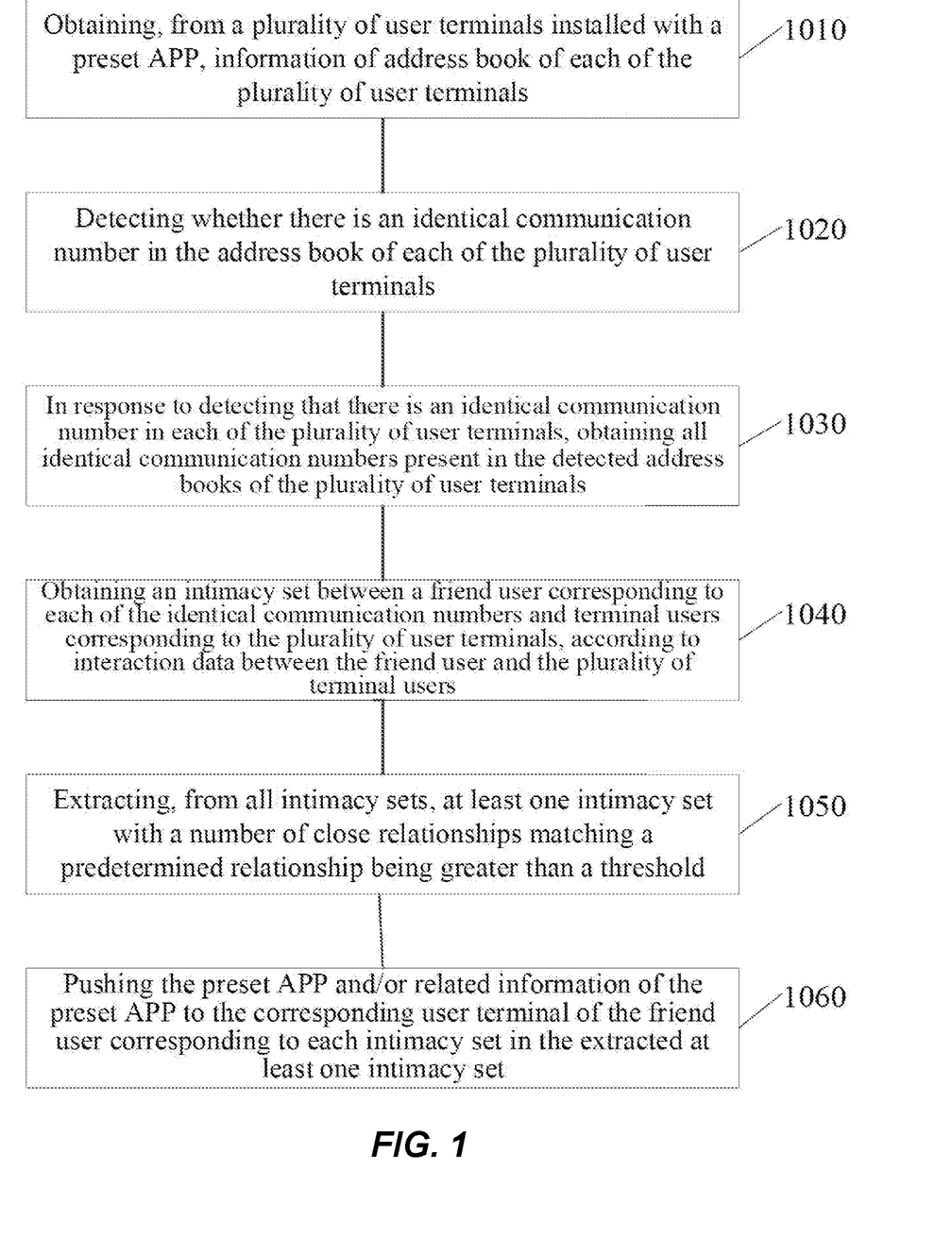
FIG. 1 is a flowchart of an APP pushing method according to an embodiment.

FIG. 1 is a flowchart of the APP pushing method according to an embodiment. As illustrated in FIG. 1, the APP pushing method provided in the present embodiment includes steps described below.

Step 1010: information of address book of each user terminal is obtained from a plurality of user terminals installed with a preset APP.

Step 1020: detection is performed as to whether there is an identical communication number in the address book of each of the plurality of user terminals.

Step 1030: all identical communication numbers present in the detected address books of the plurality of user terminals are obtained in response to detecting that there is an identical communication number in each of the plurality of user terminals.

Step 1040: an intimacy set between each friend user corresponding to each of the identical communication numbers and terminal users corresponding to the plurality of user terminals is obtained according to interaction data between the friend user and the plurality of terminal users;

Step 1050: at least one intimacy set with a number of close relationships matching a predetermined relationship being greater than a threshold is extracted from all intimacy sets.

Step 1050: the preset APP and/or related information of the preset APP is pushed to the corresponding user terminal of the friend user corresponding to each intimacy set in the extracted at least one intimacy set.

In an embodiment, the preset APP may be a designated APP or any APP. In an embodiment, the user terminal includes a smart phone, a smart Television and a Tablet personal computer, etc.

In an embodiment, in Step 1010, each of the plurality of user terminals is installed with the preset APP, and then the information of address book of each user terminal is obtained. The plurality of user terminals may be divided into a group of user terminals.

In a process of implementation, first, a plurality of user terminals installed with the preset APP are selected from a large number of user terminals, and the address book information is obtained from each selected user terminal. In an embodiment, the address book information includes at least one communication number, and may also include zero communication number, which will not be limited in the present disclosure. In an embodiment, the plurality of user terminals are user terminals in the number of not less than 2, such as user terminals in the number of 2, 3, 5, or 10.

In an embodiment, the plurality of user terminals are user terminals in set number of not less than 2, for example, the set number may be a value of not less than 2, such as 2, 3, 5, and 10.

In an embodiment, the set number may be preset by a device, or may also be automatically adjusted according to pushing effect, or may further be set by an operator, which however will not be limited in the present disclosure.

In an embodiment, after the set number is determined, all user terminals installed with the preset APP may be selected from a large number of user terminals. Then at least one group of user terminal sets is selected from all the selected user terminals according to a preset rule, and a number of user terminals in each group of user terminal sets is a set number. Then the information of address book of each user terminal in each group of user terminal sets is obtained.

In an embodiment, the preset rule may be, for example, a random selection rule, a sequential selection rule, and a conditional selection rule, where the conditional selection rule may be, for example, a conditional selection rule based on the area to which the user terminal belongs, a conditional selection rule based on the area where the user terminal is used, and a parameter conditional selection rule based on the user terminal.

For example, the number of user terminals installed with the preset APP selected from 1000 user terminals is 200, if the set number is 4. At this moment, 70 groups of user terminal sets are selected from 200 user terminals according to the conditional selection rule, and the number in each group of user terminal sets is 4; then the information of address book of each user terminal in each group of user terminal sets is obtained.

In an embodiment, each time the number of selected user terminals installed with the preset APP reaches the set number, all user terminals selected at this moment may be used as the plurality of user terminals, and the address book information from each user terminal is obtained. For example, if the set number is 3, each time three user terminals installed with the preset APP are selected, then the address book information is obtained from each of the three selected user terminals.

In an embodiment, before obtaining the address book information from the selected plurality of user terminals, determination needs to be made as to whether the user of each user terminal has authorized to read the address book information; if it is determined that the plurality of user terminals has authorized to read the address book information, then the address book information of the authorized plurality of user terminals is obtained.

For example, the number of user terminals installed with the preset APP selected from 1000 user terminals is 200, at this moment, 120 authorized user terminals are extracted from the 200 selected user terminals, if the set number is 5; at this moment, according to the conditional selection rule, 30 groups of user terminal sets are selected from 120 user terminals, and the number of each group of user terminal sets is 5; then the information of address book of each user terminal in each group of user terminal sets is obtained.

For another example, the number of user terminals installed with the preset APP selected from 1000 user terminals is 200, if the set number is 5; at this moment, every time 5 authorized user terminals are determined from the 200 user terminals, and the address book information in each of the determined 5 user terminals is acquired.

In an embodiment, a frequency of use of the preset APP installed in each user terminal is not less than a preset frequency, and/or, a latest time of use of the preset APP installed in each user terminal is set within a set time range.

In an embodiment, the preset frequency may be once a month, once every three months, or three times a year, etc., and the set time range may be, for example, within 1 week, within 3 weeks, within 1 month, within 2 months or within 4 months, etc., which is not specifically limited in this disclosure.

In an embodiment, when a plurality of user terminals installed with the preset APP are selected from a large number of user terminals, a first precondition that the frequency of use of the preset APP installed in the user terminal is not less than the preset frequency is set; then the plurality of user terminals satisfying the first precondition are selected from the large number of user terminals.

In an embodiment, when a plurality of user terminals installed with the preset APP are selected from a large number of user terminals, a second precondition that the latest time of use of the preset APP installed in the user terminal is within the set time range is also set; then the plurality of user terminals satisfying the second precondition are selected from the large number of user terminals.

In an embodiment, when a plurality of user terminals installed with the preset APP are selected from a large number of user terminals, the first precondition and the second precondition will be set; then the plurality of user terminals satisfying the first precondition and the second precondition are selected from the large number of user terminals. In this way, we have a higher matching degree between the selected plurality of user terminals and the preset APP, so that a matching degree between the user terminal corresponding to all identical communication numbers detected in the address book of the plurality of selected user terminals and the preset APP is also increased, thereby improving the preset APP pushing accuracy; and the APP pushing speed will also be greatly improved when the APP pushing accuracy is similar.

For example, a number of user terminals which are installed with the preset APP, have the time of use of more than once every three months and are selected from 1000 user terminals is 200. At this moment, 120 authorized user terminals are extracted from the selected 200 user terminals, if the set number is 5; at this moment, 30 groups of user terminal sets are selected from 120 user terminals according to the conditional selection rule, and the number in each group of user terminal sets is 5; then the information of address book of each user terminal in each group of user terminal sets is obtained.

In step 1020, the communication numbers in the address book of the plurality of user terminals may be compared, so as to detect whether the identical communication numbers exist in the address book of the plurality of user terminals; Step 1030 is executed, if the identical communication numbers are detected; and no processing is performed, if no identical communication number is detected, at this moment, the operation of Step 1020 may be continued to be executed on another group of the plurality of user terminals.

In a process of implementation, it can be detected whether each communication number in the address book of any one of the user terminal is in the address book of each user terminal in remaining user terminals, where the any one of the user terminals and the remaining user terminals form the plurality of user terminals.

For example, the plurality of user terminals include four user terminals: smart phone A, smart phone B, smart phone C, and smart phone D, where the four user terminals are denoted by A, B, C, and D in the following. If the communication numbers stored in address book information of A include a1, a2, a3, a4, a5, and a6, compare each of the communication numbers of A with the communication numbers in the address book of B, C, and D; if it is compared that the communication numbers a3 and a5 in the address book of A are both stored in the address book of B, C and D, identical communication numbers are detected to exist in the 4 user terminals, then Step 1030 is executed; and if it is compared that none of the communication numbers in the address book of A is stored in the address book of B, C and D, identical communication number are detected not to exist in the four user terminals.

In an embodiment, each communication number in the address book of B, C, and D may also be selected to be compared with the communication numbers in the address book in other user terminals, which is not limited in the present disclosure.

When it is detected in Step 1020 that there is an identical communication number in each of the plurality of user terminals, Step 1030 is executed to obtain all identical communication numbers that are detected.

In a process of implementation, during the process of detecting whether each communication number in the address book of any one of the user terminal is in the address book of each user terminal in the remaining user terminals, the identical communication number may be saved every time the identical communication number is detected, until all the communication numbers in the address book in the user terminal are detected, all identical communication numbers detected are saved.

For example, the plurality of user terminals include A, B, C, and D. If any one of the user terminal selects A, compare each of the communication numbers in a1, a2, a3, a4, a5 and a6 in the address book of A with the communication numbers in the address book of B, C and D; if a comparison sequence of the communication numbers is a1, a2, a3, a4, a5 and a6, when comparing a1-a3 in sequence, if it is compared that a3 in the address book of A is stored in the address book of B, C and D, then a3 is saved; then continue to compare a4-a6, when comparing a4-a6 in sequence, if it is compared that a5 is stored in the address book of B, C and D, then a5 is saved; and finally it is obtained that the saved a3 and a5 are all identical communication numbers detected.

Next, Step 1040 is executed. First, a friend user corresponding to each identical communication number is determined from all identical communication numbers, and then interaction data between each friend user and the plurality of terminal users is obtained; then an intimacy set corresponding to each friend user is obtained according to the interaction data between each friend user and the plurality of terminal users.

In an embodiment, the interaction data includes voice record data and text record data between the friend user and the terminal user. In an embodiment, the text record data includes at least one type of data such as short message service (SMS) interaction data and text interaction data of social software installed on each user terminal.

In the implementation process, after obtaining the interaction data between each friend user and the plurality of terminal users, an intimacy set between each friend user and the plurality of terminal users is determined according to interaction contents in the interaction data between each friend user and the plurality of terminal users.

In an embodiment, at least one of an addressing, interaction contents theme, etc. between friend users and terminal users is extracted from the interaction contents by analyzing the interaction contents in the interaction data between each friend user and the plurality of terminal users; then the intimacy (or interchangeably referred to as "close relationship") between each friend user and each terminal user of the plurality of terminal users is determined according to at least one of the extracted addressing, interaction contents theme, etc.; and the close relationship between each friend user and the plurality of terminal users is determined to form the intimacy set corresponding to the friend user.

In an embodiment, the close relationship between each friend user and each of the plurality of terminal users may also be determined by analyzing interaction frequency in the interaction data between each friend user and the plurality of terminal users; and the close relationship between each friend user and each of the plurality of terminal users may also be determined by analyzing the interaction contents and interaction frequency in the interaction data between each friend user and the plurality of terminal users, which is not limited in the present disclosure.

In an embodiment, after the addressing and interaction contents theme are extracted, first, whether the addressing is able to accurately determine the close relationship between the friend user and the terminal user is analyzed; if the addressing is able to accurately determine the close relationship between the friend user and the terminal user, the determined close relationship is used as the intimacy between the friend user and the terminal user. If the addressing cannot accurately determine the close relationship between the friend user and the terminal user, the interaction contents theme is analyzed, and when the obtained number of interaction contents themes that belong to a certain theme type is large, then the close relationship between the friend user and the terminal user is determined according to the theme types with a relatively large number of addressing and interaction contents theme.

For example, if terms "daddy, mom, elder sister, elder brother, younger sister" between the friend user and the terminal user has a clear referential relationship, the close relationship between the friend user and the terminal user may be determined. In an embodiment, if terms "a certain elder sister, another certain sister, a certain elder brother, a certain younger brother" cannot be used as words indicative of a clear referential relationship, at this moment, it is also needed to determine the close relationship by combining the theme type with a relatively large number of interaction contents themes.

In an embodiment, the theme types of content themes may be divided into a family theme, a work theme, and an information theme. When it is analyzed that the theme type to which the interaction contents theme belongs is that there are more of family themes and the addressing also matches the addressing within the family, the close relationship between the friend user and the terminal user being a family relationship is determined; and when it is analyzed that the theme type to which the interaction contents theme belongs is that there are more of work themes or information themes and the addressing also matches the addressing among friends, the close relationship between the friend user and the terminal user being a friend relationship is determined In an embodiment, the close relationship may also be divided into the friend relationship, a lover relationship, an elder sister and younger brother relationship, an elder brother and younger brother relationship, and a mother-child relationship, etc., which are determined according to actual relationships of the users and not limited in the present disclosure.

For example, the plurality of user terminals include A, B, C, and D. If any one of the user terminals selects A, each communication number in the address book of A is sequentially compared with the communication numbers in the address book of B, C and D, and a comparison result obtained is that a3 and a5 are the communication numbers present in A, B, C and D; then interaction data between a friend user Q3 corresponding to a3 and a terminal user Z1 corresponding to A, a terminal user Z2 corresponding to B, a terminal user Z3 corresponding to C and a terminal user Z4 corresponding to D is obtained; and interaction data between a friend user Q5 corresponding to a5 and Z1, Z2, Z3, and Z4 is obtained.

In an embodiment, by analyzing the interaction data between Q3 and Z1, Z2, Z3, and Z4, it is determined that close relationships between Q3 and Z1, Z2, Z3, and Z4 are: friends, friends, friends, and brothers; and close relationships between Q5 and Z1, Z2, Z3, and Z4 are: brothers, elder sister and younger brother, friends, and friends. Therefore, it can be known that an intimacy set corresponding to Q3 is {friend relationship, friend relationship, friend relationship, and elder sister and younger brother} and an intimacy set corresponding to Q5 is {brothers, elder sister and younger brother, friends, and friends}.

In the present embodiment, since the intimacy set between each friend user and the plurality of terminal users is obtained according to interaction data between the friend user corresponding to each identical communication number and terminal users corresponding to the plurality of user terminals, the accuracy of each close relationship in the obtained intimacy set is high.

Next, Step 1050 is executed, detecting whether a number of close relationships in each intimacy set matching the predetermined relationship is greater than the threshold may be performed first to obtain a detection result; and at least one intimacy set whose number of close relationships matches the predetermined relationship is greater than the threshold is extracted from all intimacy sets according to the detection result.

In the present embodiment, the extracted at least one intimacy set is formed of a partial intimacy set or all intimacy sets whose number of close relationships matching the predetermined relationship is greater than the threshold in the entire intimacy sets. In the present embodiment, the extracted at least one intimacy set is formed of all intimacy sets whose number of close relationships matching the predetermined relationship is greater than the threshold in the entire intimacy sets.

In a process of implementation, since the number of close relationships in the intimacy set corresponding to each friend user is equal to the number of the plurality of user terminals, a maximum number of close relationships that is in each intimacy set and matches the predetermined relationship is the number of the plurality of user terminals. Therefore, the maximum value of the threshold is also the number of the plurality of user terminals. Thus, the value of the threshold needs to be set within a setting range of not less than 2 and not greater than the number of the plurality of user terminals.

In an embodiment, the value of the threshold within the setting range may be set according to actual conditions, or may be set by the user or a system, which is not limited in the present disclosure. For example, if the number of the plurality of user terminals is 5, then the threshold may be any one of 2, 3, 4, and 5.

In an embodiment, the matching between the close relationship and the predetermined relationship may refer to that the close relationship is identical with the predetermined relationship or the intimacy and the predetermined relationship are of an identical type. Take a relationship that belongs to the identical type as an example, for example, the close relationship is an elder brother and younger brother relationship, and the predetermined relationship is a family relationship, it can be determined that the close relationship matches the predetermined relationship.

For example, the plurality of user terminals include A, B, C, and D. If any one of the user terminals selects A, each communication number in the address book of A is sequentially compared with the communication numbers in the address book of B, C and D, and a comparison result obtained is that a3 and a5 are the communication numbers present in A, B, C and D. Then, the intimacy set corresponding to the friend user Q3 corresponding to a3 being {friends, friends, friends, and elder sister and younger brother} and the intimacy set corresponding to the friend user Q5 corresponding to a5 being {brothers, elder sister and younger brother, friends, and friends} are obtained. If the predetermined relationship is the friend relationship and the threshold is 2, a number of friend relationships in the intimacy set corresponding to Q3 is detected to be 3>2 and a number of friend relationships in the intimacy set corresponding to Q5 is 2=2, then Q3 is extracted from Q3 and Q5.

In the present embodiment, in a condition that the accuracy of each close relationship in the obtained intimacy set is high, at least one intimacy set whose number of close relationships matching the predetermined relationship is greater than the threshold is extracted from all intimacy sets, and push the preset APP and/or related information of the preset APP to the user terminal corresponding to each friend user corresponding to the extracted at least one intimacy set. On the basis that a probability that the users corresponding to all identical communication numbers and the users corresponding to the plurality of user terminals belong to the identical type is greatly increased and the accuracy of the intimacy is high, the friend users who more closely match the preset APP are selected through a matching relationship of the close relationship, and then the information is pushed. In this way, the preset APP and/or related information of the preset APP may be pushed to the user terminal with the higher matching degree with the preset APP, thereby effectively improving the pushing accuracy of the preset APP and the related information of the preset APP.

Next, Step 1060 is executed. In Step 1060, the preset APP or the related information of the preset APP or the preset APP and the related information of the preset APP may be pushed to the corresponding user terminal of the at least one friend user corresponding to the extracted at least one intimacy set by means of SMS, telephone, or social application, etc.

In an embodiment, the social application means may be pushed through an APP such as a WeChat® APP or a DingTalk® APP. In an embodiment, the related information may include introduction information of the preset APP, content information of the preset APP, promotion information of the preset APP, information associated with the APP, and the like. In an embodiment, the promotion information includes text advertisements or video advertisements, etc., and the information associated with the APP may be an APP similar to the APP and related information of the similar APP.

In an embodiment, one communication number corresponds to one friend user, and one friend user corresponds to one user terminal, that is, the communication number, the friend user, and the user terminal are in one-to-one correspondence. As illustrated in the following table:

TABLE 1

| Communication numbers | Friend user | User terminal |
|---|---|---|
| a3 | Q3 | E3 |
| a5 | Q5 | E5 |

For example, the plurality of user terminals include A, B, C, and D. If any one of the user terminals selects A, each communication number in the address book of A is sequentially compared with the communication numbers in the address book of B, C and D, and a comparison result obtained is that a3 and a5 are the communication numbers present in A, B, C and D. Then, the intimacy set corresponding to the friend user Q3 corresponding to a3 being {friends, friends, friends, and elder sister and younger brother} and the intimacy set corresponding to the friend user Q5 corresponding to a5 being {brothers, elder sister and younger brother, friends, and friends} are obtained. If the predetermined relationship is the friend relationship and the threshold is 2, a number of friend relationships in the intimacy set corresponding to Q3 is detected to be 3>2 and a number of friend relationships in the intimacy set corresponding to Q5 is 2=2, then Q3 is extracted from Q3 and Q5, and the user terminal corresponding to Q3 is E3, and the user terminal corresponding to Q5 is E5, then the preset APP and/or related information of the preset APP is pushed to the user terminal E3 corresponding to Q3 through SMS and/or WeChat®.

In the present embodiment, a provided technical solution is to obtain all identical communication numbers from the address book information of the plurality of user terminals installed with the preset APP, so that a probability that the obtained users corresponding to all identical communication numbers and the users corresponding to the plurality of user terminals belong to an identical type of users is greatly increased. On the basis that the probability that the users corresponding to all identical communication numbers and the users corresponding to the plurality of user terminals belong to the identical type of users is greatly increased, the matching degree between the preset APP and the users corresponding to all identical communication numbers will be higher. In this way, the preset APP is pushed to the user terminal corresponding to the communication number with a high matching degree with the preset APP, thereby effectively improving the pushing accuracy of the preset APP.

Figure 2:
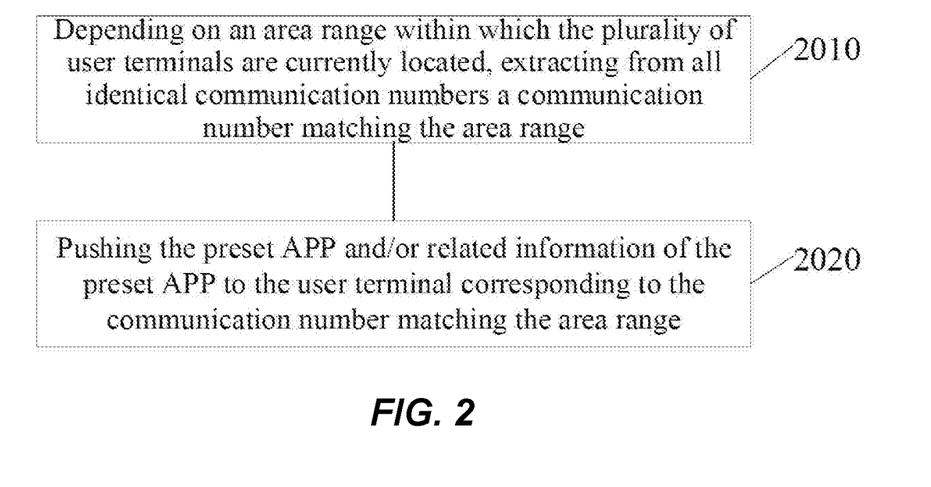
FIG. 2 is a flowchart of an APP pushing method according to another embodiment.

In another embodiment, after obtaining all identical communication numbers present in the detected address books of the plurality of user terminals, as shown in FIG. 2, the method further includes:

In an embodiment, after executing Step 1040, and after obtaining each communication number corresponding to each extracted intimacy set, Steps 2010 and 2020 may be executed for each communication number corresponding to each extracted intimacy set.

Step 2010: communication numbers matching the area range are extracted from all identical communication numbers depending on an area range within which the plurality of user terminals are currently located.

In an embodiment, the area range where the plurality of user terminals are currently located may be determined according to the obtained plurality of areas where the plurality of user terminals are currently located; then the communication numbers matching the area range are extracted from all identical communication numbers according to the area range.

In an embodiment, the area where each user terminal is currently located may be a city, a certain area or town in the city, a building in certain area or town in the city and the like, where each user terminal is currently located. In an embodiment, according to actual needs, the area where each user terminal is currently located may be positioned more accurately, or a positioned range may be expanded, which however will not be limited in the present disclosure.

In an embodiment, the communication number matching the area range is a communication number where the current location of the user terminal corresponding to the communication number in all identical communication numbers is within the area range. In an embodiment, the communication number matching the area range may also be the communication number where the current location of the user terminal corresponding to the communication number in all identical communication numbers is within the area range and a communication number where a distance between the current location of the user terminal corresponding to the communication number in all identical communication numbers and the area range does not exceed a set distance. In an embodiment, the set distance is set according to an actual condition, and may also be automatically adjusted according to the pushing effect, where the set distance may be, for example, 10 kilometers, 20 kilometers, or 50 kilometers, etc.

In an embodiment, when obtaining the area where each user terminal is currently located, the area where each user terminal is currently located may be determined according to a positioning device or an external positioning device in the plurality of user terminals. In an embodiment, the positioning device includes a Global Positioning System (GPS) satellite positioning chip or a Beidou® satellite positioning chip.

In an embodiment, when determining the area range where the plurality of user terminals are currently located according to the plurality of areas where the plurality of user terminals are currently located, the area where each user terminal is currently located may be obtained first, then the plurality of areas where the plurality of user terminals are currently located are linked to obtain a linked area. At this moment, the linked area may be used as the area range where the plurality of user terminals are currently located.

In an embodiment, after the linked area is obtained, the linked area may be modified according to the linked area and city distribution data. And the modified linked area may be used as the area range where the plurality of user terminals are currently located.

In an embodiment, the modifying the linked area based on the linked area and city distribution data includes: obtaining an extension area of the linked area based on the linked area and city distribution data; at this moment, the modified linked area is the linked area and the extension area, and the linked area and the extension area are used as the area range where the plurality of user terminals are currently located; or, the linked area may be reduced based on the linked area and city distribution data, at this moment, the modified linked area is a reduced linked area, which is used as the area range where the plurality of user terminals are currently located.

In an embodiment, when extending and reducing the linked area, the city distribution in the linked area and a distance relationship between the linked area and other cities are obtained by analyzing the linked area and city distribution data. Then the linked area is extended or reduced according to the city distribution in the linked area and the distance relationship, and the extended or reduced linked area is used as the area range where the plurality of user terminals are located.

In an embodiment, in a process of extending or reducing the linked area through the city distribution in the linked area and the distance relationship, if a distance between a certain city in the linked area and a remaining area is too far, that is, exceeds a first preset distance, an area in linkage with the city in the linked area may be reduced, and the reduced linked area may be used as the area range where the plurality of user terminals are currently located. At this moment, the area range where the plurality of user terminals are currently located becomes smaller and city connections closeness in the area is improved, which promotes accuracy of the area range where the plurality of user terminals are currently located.

In an embodiment, the first preset distance may be set according to actual conditions, or may be dynamically adjusted according to the pushing effect. For example, the first preset distance may be 60 kilometers, 100 kilometers, or 150 kilometers, etc. Generally, the set distance will be less than the first preset distance. In an embodiment, the set distance may also have an identical value as that of the first preset distance, and the set distance may also be less than the first preset distance, which is not limited in the present disclosure.

In an embodiment, if a distance between the linked area and a certain city is less than a second preset distance, it is determined that the city is within a radiation range of the linked area, thereby using the linked area and the city as the area range where the plurality of user terminals are currently located. At this time, while ensuring the city connections closeness within the area range where the plurality of user terminals are currently located, it is also possible to expand the area range where the plurality of user terminals are currently located, that is, it is possible to ensure the accuracy of the area range where the plurality of user terminals are currently located and expand the area range.

In an embodiment, the second preset distance may be set according to actual conditions, or may be dynamically adjusted according to the pushing effect. For example, the second preset distance may be 30 kilometers, 40 kilometers, or 50 kilometers, etc. Generally, the second preset distance will be less than the first preset distance. In an embodiment, the second preset distance may have an identical value as that of the first preset distance, and may also be greater than the first preset distance, which is not limited in the present disclosure.

Figure 3:
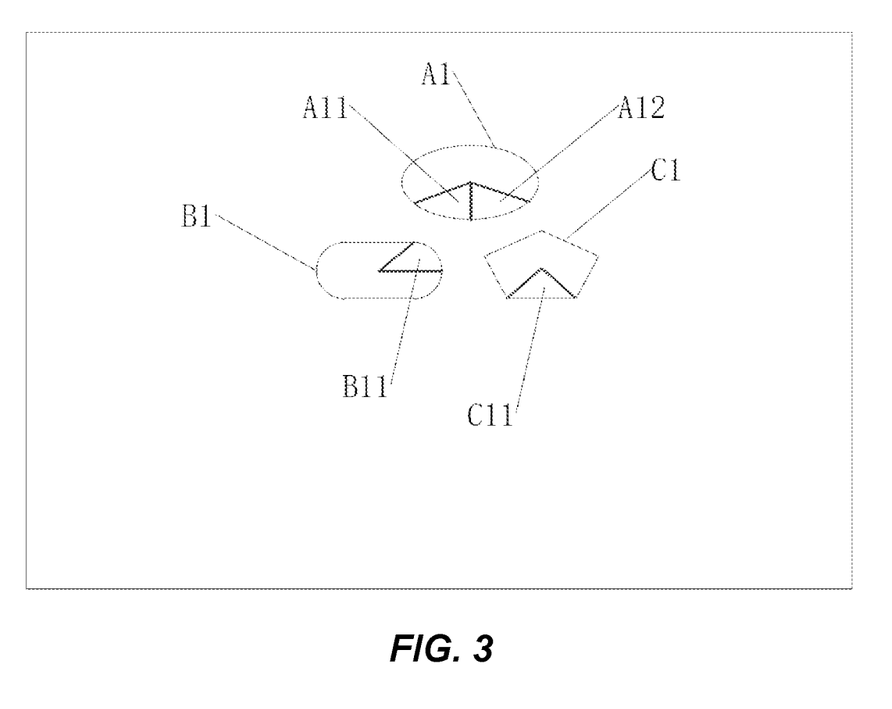
FIG. 3 is a schematic diagram of an area where each user terminal is currently located according to an embodiment.
Figure 4:
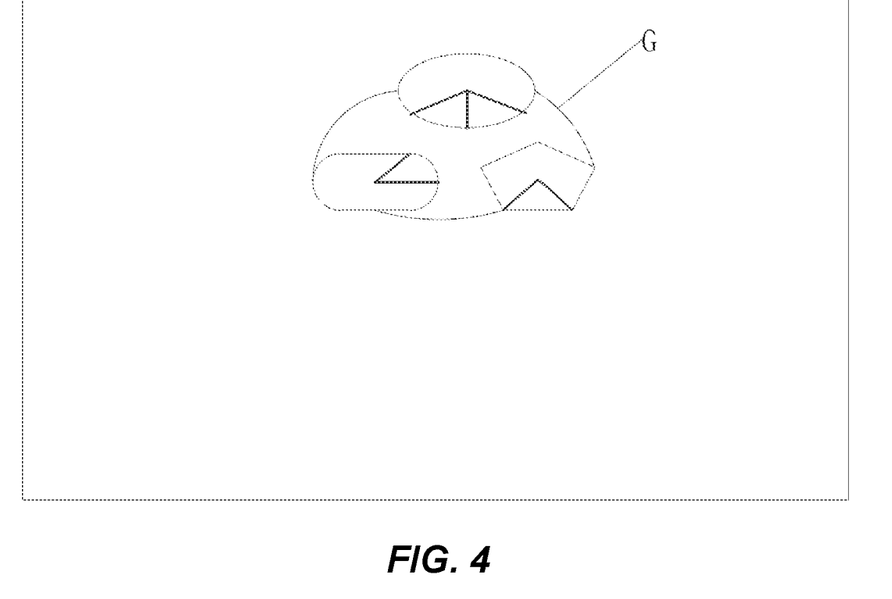
FIG. 4 is a schematic diagram of an area range within which a plurality of user terminals are currently located according to an embodiment.

For example, as illustrated in FIGS. 3 and 4, the plurality of user terminals include A, B, C, and D, and according to the Global Positioning System (GPS) chips in A, B, C, and D, it is determined that an area where A is currently located is A11 area of A1 city, an area where B is currently located is A12 area of the A1 city, an area where C is currently located is B11 area of B1 city, and an area where D is currently located is C11 area of C1 city, then an linked area surrounded by four areas A11, A12, B11 and C11 is taken as an area range where A, B, C and D are currently located. In an embodiment, a linked area G surrounded by three areas A1, B1, and C1 may also be used as the area range where A, B, C, and D are currently located.

In an embodiment, after obtaining G, G and the city distribution data may be analyzed. If it is analyzed that a distance between the G and city D1 is not more than 10 kilometers, the second preset distance is 10 kilometers, and D1 may be used as an extension area of G. At this moment, G and D1 are used as the area range where A, B, C, and D are currently located. In an embodiment, if it is analyzed that distances from C1 to A1 and B1 in G both exceed 100 kilometers, the first preset distance is 100 kilometers, and a distance between A1 and B1 does not exceed 100 kilometers, then C1 is reduced in G, and only the linked area surrounded by two areas A1 and B1 is reserved as the area range where A, B, C, and D are currently located; or only the linked area surrounded by three areas A11, A12, and B11 is reserved as the area range where A, B, C, and D are currently located.

Step 2020: the preset APP and/or related information of the preset APP is pushed to the user terminal corresponding to the communication number matching the area range.

In an embodiment, after the communication number matching the area range being extracted in Step 2010, the preset APP or related information of the preset APP or the preset APP and/or related information of the preset APP is pushed to each user terminal corresponding to the communication number matching the area range.

In an embodiment, the implementation of Step 2020 may refer to that of Step 1060, and details are not described herein again.

For example, the plurality of user terminals include A, B, C, and D, and it is detected that all identical communication numbers in the four user terminals are a3 and a5, at this moment, the area where A, B, C and D are currently located is determined according to the GPS chips in A, B, C and D. Then the linked area G where A, B, C, and D are currently located and city distribution data are analyzed, where the linked area G are surrounded by the areas A1, B1, and C1. If it is analyzed that a distance between G and city D1 is less than 10 kilometers, then G and D1 are taken as the area range where A, B, C and D are currently located; then whether the location where a3 and a5 are currently located is within the area range is checked. If it is detected that the location where a5 is currently located is within the area range, the preset APP and/or related information of the preset APP is pushed to the user terminal corresponding to a5.

In an embodiment, if it is analyzed that distances from C1 to A1 and B1 in G both exceed 100 kilometers, the first preset distance is 100 kilometers, and a distance between A1 and B1 does not exceed 100 kilometers, then C1 is reduced in G, and only the linked area surrounded by two areas A1 and B1 may be reserved as the area range where A, B, C, and D are currently located; or only the linked area surrounded by three areas A11, A12, and B11 may be reserved as the area range where A, B, C, and D are currently located. Then whether the location where a3 and a5 are currently located is within the area range is checked. If it is detected that the location where a5 is currently located is within the area range, the preset APP is pushed to the user terminal corresponding to a5.

In the present embodiment, in a process of extending or reducing the linked area through the city distribution in the linked area and the distance relationship, if a certain city in the linked area is too far away from the remaining areas, the area in linkage with the city in the linked area may be reduced, and the reduced linked area may be used as the area range where the plurality of user terminals are currently located. At this moment, the area range where the plurality of user terminals are currently located becomes smaller and city connections closeness in the area is improved, which promotes accuracy of the area range where the plurality of user terminals are currently located. If a distance between the linked area and a certain city is less than the preset distance, it is determined that the city is within the radiation range of the linked area, thereby using the linked area and the city as the area range where the plurality of user terminals are currently located. At this time, while ensuring the city connections closeness within the area range where the plurality of user terminals are currently located, it is also possible to expand the area range where the plurality of user terminals are currently located, that is, it is possible to ensure the accuracy of the area range where the plurality of user terminals are currently located and expand the area range.

In an embodiment, under a condition that the accuracy of the area range is ensured, a probability that a communication number matching the area range and extracted from all identical communication numbers is a communication number of a target customer may be greatly increased, which may further improve the pushing accuracy of the preset APP and related information of the preset APP.

Figure 5:
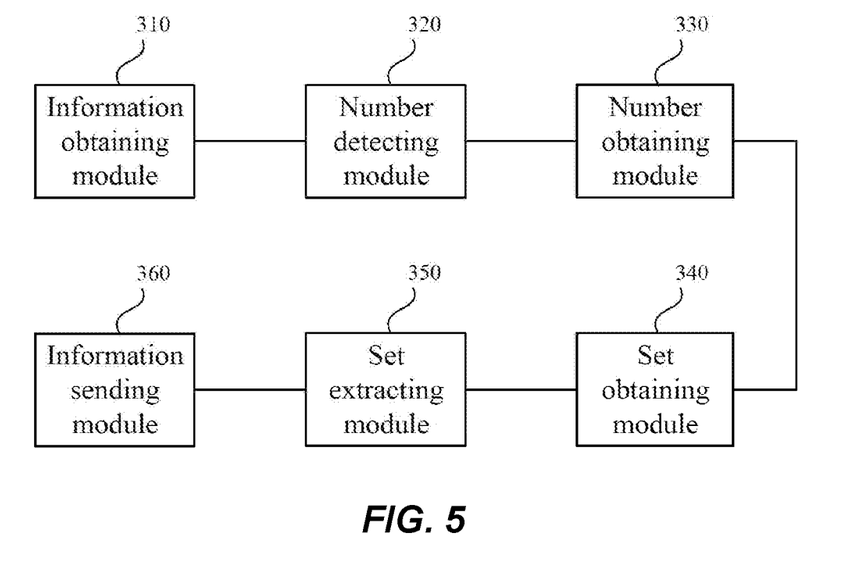
FIG. 5 is a block diagram of an APP pushing device according to an embodiment.

FIG. 5 is a block diagram of an APP pushing device according to an embodiment. As shown in FIG. 5, the APP pushing device provided in the present embodiment includes: an information obtaining module 310, configured to obtain information of address book of each user terminal from the plurality of user terminals installed with the preset APP; a number detecting module 320, configured to detect whether there is an identical communication number in the address book of the plurality of user terminals; a number obtaining module 330, configured to obtain all identical communication numbers present in the detected address books of the plurality of user terminals when detecting that there is an identical communication number in each of the plurality of user terminals; a set obtaining module 340, configured to obtain the intimacy set between each friend user and the plurality of terminal users according to interaction data between the friend user corresponding to each identical communication number and terminal users corresponding to the plurality of user terminals; a set extracting module 350, configured to extract at least one intimacy set whose number of close relationships matches the predetermined relationship is greater than the threshold from all intimacy sets; and a first information sending module 360, configured to push at least one of the preset APP and related information of the preset APP to the user terminal corresponding to the friend user corresponding to each intimacy set in the extracted at least one intimacy set.

On the basis that the probability that users corresponding to all the identical communication numbers across the plurality of user terminals belong to the same type of users as the corresponding users of the plurality of user terminals is largely increased, the technical solution provided by the present embodiment selects out the friend users better matching the preset APP depending on the close relationship, and then pushes the related information of the preset APP. Thus, the preset APP and/or related information of the preset APP may be pushed to a user terminal with a higher matching degree with the preset APP, thereby effectively improving the accuracy of pushing the preset APP and the related information of the preset APP.

In an embodiment, the set obtaining module 340 is configured to determine the intimacy set between each friend user and the plurality of terminal users according to interaction contents in the interaction data between the friend user corresponding to each of the identical communication numbers and the plurality of terminal users.

In an embodiment, the set extracting module 350 is configured to detect whether a number of close relationships in each intimacy set matching the predetermined relationship is greater than the threshold to obtain a detection result; and at least one intimacy set whose number of close relationships matches the predetermined relationship is greater than the threshold is extracted from all intimacy sets according to the detection result.

In an embodiment, the preset APP installed in each user terminal satisfies at least one of following conditions: the frequency of use of the preset APP installed in each user terminal is not less than the preset frequency, and a latest time of use of the preset APP installed in each user terminal is within the set time range.

In an embodiment, the above-mentioned device further includes the number extracting module configured to extract a communication number matching the area range from all identical communication numbers according to the area range where the plurality of user terminals are currently located; and a second information sending module configured to push the preset APP and related information of the preset APP to the user terminal corresponding to the communication number matching the area range.

In an embodiment, the number extracting module includes: a range determination unit configured to determine the area range where the plurality of user terminals are currently located according to the obtained plurality of areas where the plurality of user terminals are currently located; and a number extracting unit configured to extract the communication number matching the area range from all identical communication numbers according to the area range.

In an embodiment, the range determination unit is configured to link the obtained plurality of areas where the plurality of user terminals are currently located to obtain the linked area; modify the linked area according to the linked area and city distribution data; and use the modified linked area as the area range where the plurality of user terminals are currently located.

Figure 6:
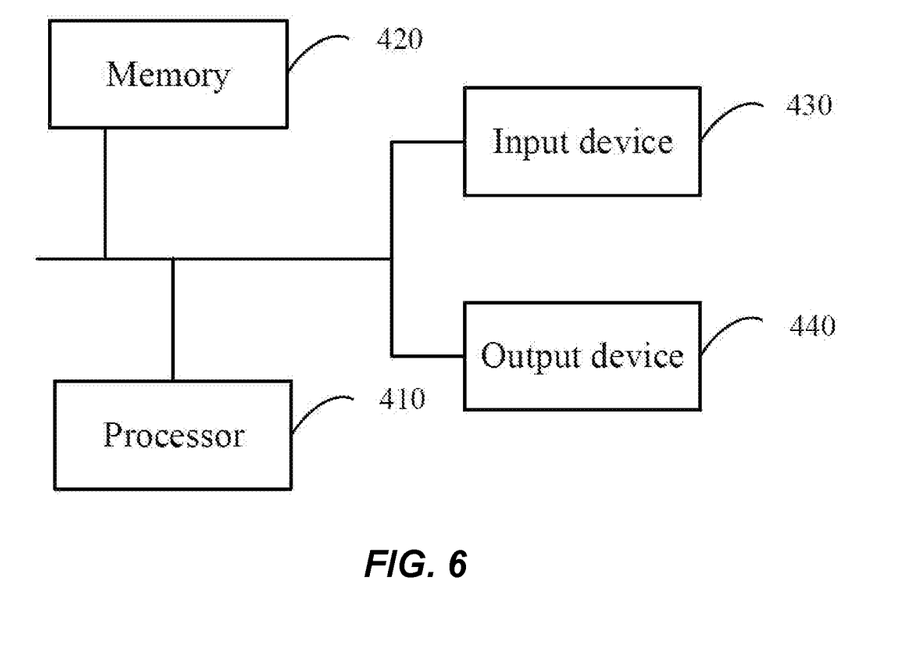
FIG. 6 is a block diagram of an electronic device according to an embodiment.

FIG. 6 is a schematic diagram of an electronic device according to an embodiment. As illustrated in FIG. 6, the electronic device includes a processor 410, a memory 420, an input device 430 and an output device 440. The at least one processor 410 may be disposed in the electronic device, where in FIG. 6 one processor 410 is taken as an example. The processor 410, the memory 420, the input device 430 and the output device 440 in the electronic device may be connected by a bus or in other modes, where in FIG. 6 connecting by a bus is used as an example.

The input device 430 may receive input digital or character information and the output device 440 may include a display device such as a display screen.

As a computer-readable storage medium, the memory 420 is used for storing software programs and computer-executable programs and modules. The processor 410 runs the software programs, instructions and modules stored in the memory 420 to execute various function applications and data processing, so as to perform any method in the above-mentioned embodiments.

The memory 420 may include a program storage and a data storage, where the program storage may store an operating system and an application program required by at least one function while the data storage may store data created depending on use of the electronic device. In addition, the memory may include a volatile memory, such as a random access memory (RAM), and may also include a nonvolatile memory, such as at least one click memory, a flash memory or other nonvolatile solid-state memories.

The memory 420 may be a non-transient computer storage medium or a transient computer storage medium. The non-transient computer storage medium includes, for example, at least one of a disk memory, a flash memory or another nonvolatile solid-state memory. In some embodiments, the memory 420 optionally includes a memory remotely that is disposed relative to the processor 410 and that may be connected to the electronic device via a network. Examples of such a network may include the Internet, intranets, local area networks, mobile communication networks, and combinations thereof.

The input device 430 may be used for receiving input digital or character information and for generating a key signal input related to user settings and function control of the electronic device. The output device 440 may include a display device such as the display screen.

All or part of the steps in the methods according to the above-mentioned embodiments may be performed by related hardware executed by computer programs, these programs may be stored in a non-transient computer-readable storage medium, and during the execution of these programs, the steps in the above-mentioned embodiments may be performed. The non-transient computer-readable storage medium may be a magnetic disk, an optical disk, a read-only memory (ROM) or a random access memory (RAM).

The present embodiment further provides a computer-readable storage medium that store a computer programs, and when executed by the processor, the computer program implements the following steps: the information of address book of each user terminal is obtained from the plurality of user terminals installed with the preset APP; whether there is an identical communication number in the address book of the plurality of user terminals is detected; all identical communication numbers present in the detected address books of the plurality of user terminals are obtained when detecting that there is an identical communication number in each of the plurality of user terminals; the intimacy set between each friend user and the plurality of terminal users is obtained according to interaction data between the friend user corresponding to each identical communication number and terminal users corresponding to the plurality of user terminals; at least one intimacy set whose number of close relationships matching the predetermined relationship being greater than the threshold is extracted from all intimacy sets; and at least one of the preset APP and related information of the preset APP is pushed to the user terminal corresponding to the friend user corresponding to each intimacy set in the extracted at least one intimacy set.

In an embodiment, the processor executing interaction data between the friend user corresponding to each identical communication number and the terminal user corresponding to the plurality of user terminals to obtain the intimacy set between each friend user and the plurality of terminal users includes the following step: the intimacy set between each friend user and the plurality of terminal users is determined according to the interaction contents in the interaction data between the friend user corresponding to each identical communication number and the plurality of terminal users.

In an embodiment, the processor executing extracting at least one intimacy set whose number of close relationships matches the predetermined relationship is greater than the threshold from all intimacy sets includes the following steps: whether a number of close relationships in each intimacy set matching the predetermined relationship is greater than the threshold is detected to obtain the detection result; and at least one intimacy set whose number of close relationships matches the predetermined relationship is greater than the threshold is extracted from all intimacy sets according to the detection result.

In an embodiment, the preset APP installed in each user terminal in the plurality of user terminals satisfies at least one of following conditions: the frequency of use of the preset APP installed in each user terminal is not less than the preset frequency, and the latest time of use of the preset APP installed in each user terminal is within the set time range.

In an embodiment, after executing the obtaining all identical communication numbers in the detected address books of the plurality of user terminals, the processor also executes the following steps: communication numbers matching the area range are extracted from all identical communication numbers according to the area range where the plurality of user terminals are currently located; and the preset APP and related information of the preset APP are pushed to each user terminal corresponding to the communication number matching the area range.

In an embodiment, the processor executes the extracting the communication number matching the area range from all identical communication numbers according to the area range where the plurality of user terminals are currently located includes the following steps: the area range where the plurality of user terminals are currently located is determined according to the obtained plurality of areas where the plurality of user terminals are currently located; and the communication numbers matching the area range is extracted from all identical communication numbers according to the area range.

In an embodiment, the processor executing the determining the area range where the plurality of user terminals are currently located according to the plurality of areas where the plurality of user terminals are currently located respectively includes the following steps: the plurality of areas where the obtained plurality of user terminals are currently located respectively are linked to obtain the linked area; the linked area is modified according to the linked area and city distribution data; and the modified linked area is used as the area range where the plurality of user terminals are currently located.

In the present embodiment, all identical communication numbers are obtained from the address books of the plurality of user terminals installed with the preset APP, so that the probability that the users corresponding to all obtained identical communication numbers belong to the same type of users as the corresponding users of the plurality of user terminals is greatly increased. Then an intimacy set between a friend user corresponding to each identical communication number and the plurality of terminal users corresponding to the plurality of user terminals is obtained based on interaction data between the friend user and the terminal users. Then at least one intimacy set with the number of close relationships matching the predetermined relationship being greater than the threshold is extracted from all intimacy sets, and then the preset APP and/or related information of the preset APP is pushed to the corresponding at least one user terminal of the at least one friend user corresponding to the extracted at least one intimacy set. On the basis that the probability that the users corresponding to all identical communication numbers belong to the same type of users as the corresponding users of the plurality of user terminals is greatly increased, the friend users more closely matching the preset APP are selected depending on the close relationship, whereby the information is pushed. As such, the preset APP and/or related information of the preset APP may be pushed to the user terminal having a higher matching degree with the preset APP, thereby effectively improving the accuracy of pushing the preset APP and/or the related information of the preset APP.

What is claimed is:

1. An application (APP) pushing method, comprising:
    obtaining information of an address book of each of a plurality of user terminals installed with a preset APP, wherein each of the plurality of user terminals belongs to a respective one of a plurality of terminal users;
    detecting whether there are identical communication numbers in address books of the plurality of user terminals;
    in response to detecting that there are the identical communication numbers in the address books of the plurality of user terminals, obtaining all the identical communication numbers each of which exists in all detected address books of the plurality of user terminals, wherein each of the identical communication numbers corresponds to a respective friend user of a plurality of friend users common to all of the plurality of terminal users;

obtaining intimacy sets, wherein each of the intimacy sets comprises types of close relationships between the plurality of terminal users and the respective friend user corresponding to each of the identical communication numbers, and the types of close relationships are determined according to interaction data between the respective friend user and the plurality of terminal users;

extracting at least one intimacy set from all the intimacy sets, wherein for each of the at least one intimacy set, a number of terminal users belonging to a same type of close relationship matching a predetermined relationship is greater than a threshold; and pushing at least one of the preset APP and related information of the preset APP to a terminal of a friend user corresponding to each of the at least one intimacy set.

2. The APP pushing method of claim 1, wherein obtaining the intimacy sets comprises:

determining the intimacy sets based on interaction contents in the interaction data between the respective friend user and the plurality of terminal users.

3. The APP pushing method of claim 2, wherein extracting the at least one intimacy set from all the intimacy sets comprises:

detecting, for each of the at least one intimacy set, whether the number of terminal users belonging to the same type of close relationship matching the predetermined relationship is greater than the threshold to obtain a detection result; and extracting the at least one intimacy set from all the intimacy sets according to the detection result.

4. The APP pushing method of claim 1, wherein the preset APP installed in each of the plurality of user terminals satisfies at least one of the following conditions: a frequency of use of the preset APP installed in each of the plurality of user terminals is not less than a preset frequency, and a latest time of use of the preset APP installed in each of the plurality of user terminals is within a set time range.

5. The APP pushing method of claim 1, further comprising the following operations subsequent to obtaining all the identical communication numbers each of which exists in all the detected address books of the plurality of user terminals:

depending on an area range within which the plurality of user terminals are currently located, extracting from all the identical communication numbers a communication number matching the area range; and pushing the preset APP and related information of the preset APP to a user terminal corresponding to the communication number matching the area range.

6. The APP pushing method of claim 5, wherein depending on the area range within which the plurality of user terminals are currently located, extracting from all the identical communication numbers the communication number matching the area range comprises:

depending on a plurality of areas where the obtained plurality of user terminals are currently individually located, determining the area range within which the plurality of user terminals are currently located; and extracting from all the identical communication numbers the communication number matching the area range.

7. The APP pushing method of claim 6, wherein depending on the plurality of areas where the obtained plurality of user terminals are individually currently located, determining the area range within which the plurality of user terminals are currently located comprises:

linking the plurality of areas where the obtained plurality of user terminals are currently individually located to obtain a linked area;

modifying the linked area based on the linked area and city distribution data; and using the modified linked area as the area range within which the plurality of user terminals are currently located.

8. An electronic device, comprising:

at least one processor; and a memory storing at least one program;

wherein the at least one program when executed by the at least one processor causes the at least one processor to perform an APP (application) pushing method, the APP pushing method comprising:

obtaining information of an address book of each of a plurality of user terminals installed with a preset APP, wherein each of the plurality of user terminals belongs to a respective one of a plurality of terminal users;

detecting whether there are identical communication numbers in address books of the plurality of user terminals;

in response to detecting that there are the identical communication numbers in the address books of the plurality of user terminals, obtaining all the identical communication numbers each of which exists in all detected address books of the plurality of user terminals, wherein each of the identical communication numbers corresponds to a respective friend user of a plurality of friend users common to all of the plurality of terminal users;

obtaining intimacy sets, wherein each of the intimacy sets comprises types of close relationships between the plurality of terminal users and the respective friend user corresponding to each of the identical communication numbers, and the types of close relationships are determined according to interaction data between the respective friend user and the plurality of terminal users;

extracting at least one intimacy set from all the intimacy sets, wherein for each of the at least one intimacy set, a number of terminal users belonging to a same type of close relationship matching a predetermined relationship is greater than a threshold; and pushing at least one of the preset APP and related information of the preset APP to a terminal of a friend user corresponding to each of the at least one intimacy set.

9. The electronic device of claim 8, wherein obtaining the intimacy sets comprises:

determining the intimacy sets based on interaction contents in the interaction data between the respective friend user and the plurality of terminal users.

10. The electronic device of claim 9, wherein extracting the at least one intimacy set from all the intimacy sets comprises:

detecting, for each of the at least one intimacy set, whether the number of terminal users belonging to the same type of close relationship matching the predetermined relationship is greater than the threshold to obtain a detection result; and extracting the at least one intimacy set from all the intimacy sets according to the detection result.

11. The electronic device of claim 8, wherein the preset APP installed in each of the plurality of user terminals satisfies at least one of the following conditions: a frequency of use of the preset APP installed in each of the plurality of user terminals is not less than a preset frequency, and a latest time of use of the preset APP installed in each of the plurality of user terminals is within a set time range.

12. The electronic device of claim 8, wherein the APP pushing method further comprises the following operations subsequent to obtaining all the identical communication numbers each of which exists in all the detected address books of the plurality of user terminals:
depending on an area range within which the plurality of user terminals are currently located, extracting from all the identical communication numbers a communication number matching the area range; and
pushing the preset APP and related information of the preset APP to a user terminal corresponding to the communication number matching the area range.

13. The electronic device of claim 12, wherein depending on the area range within which the plurality of user terminals are currently located, extracting from all the identical communication numbers the communication number matching the area range comprises:
depending on a plurality of areas where the obtained plurality of user terminals are currently individually located, determining the area range within which the plurality of user terminals are currently located; and
extracting from all the identical communication numbers the communication number matching the area range.

14. The electronic device of claim 13, wherein depending on the plurality of areas where the obtained plurality of user terminals are individually currently located, determining the area range within which the plurality of user terminals are currently located comprises:
linking the plurality of areas where the obtained plurality of user terminals are currently individually located to obtain a linked area;
modifying the linked area based on the linked area and city distribution data; and
using the modified linked area as the area range within which the plurality of user terminals are currently located.

15. A non-transitory computer-readable storage medium storing a computer program, which when executed by a processor causes an APP pushing method, the APP pushing method comprising:
obtaining information of an address book of each of a plurality of user terminals installed with a preset APP, wherein each of the plurality of user terminals belongs to a respective one of a plurality of terminal users;
detecting whether there are identical communication numbers in address books of the plurality of user terminals;
in response to detecting that there are the identical communication numbers in the address books of the plurality of user terminals, obtaining all the identical communication numbers each of which exists in all detected address books of the plurality of user terminals, wherein each of the identical communication numbers corresponds to a respective friend user of a plurality of friend users common to all of the plurality of terminal users;
obtaining intimacy sets, wherein each of the intimacy sets comprises types of close relationships between the plurality of terminal users and the respective friend user corresponding to each of the identical communication numbers, and the types of close relationships are determined according to interaction data between the respective friend user and the plurality of terminal users;
extracting at least one intimacy set from all the intimacy sets, wherein for each of the at least one intimacy set, a number of terminal users belonging to a same type of close relationship matching a predetermined relationship is greater than a threshold; and
pushing at least one of the preset APP and related information of the preset APP to a terminal of a friend user corresponding to each of the at least one intimacy set.

16. The non-transitory computer-readable storage medium of claim 15, wherein obtaining the intimacy sets comprises:
determining the intimacy sets based on interaction contents in the interaction data between the respective friend user and the plurality of terminal users.

17. The non-transitory computer-readable storage medium of claim 16, wherein extracting the at least one intimacy set from all the intimacy sets comprises:
detecting, for each of the at least one intimacy set, whether the number of terminal users belonging to the same type of close relationship matching the predetermined relationship is greater than the threshold to obtain a detection result; and
extracting the at least one intimacy set from all the intimacy sets according to the detection result.

18. The non-transitory computer-readable storage medium of claim 15, wherein the preset APP installed in each of the plurality of user terminals satisfies at least one of the following conditions: a frequency of use of the preset APP installed in each of the plurality of user terminals is not less than a preset frequency, and a latest time of use of the preset APP installed in each of the plurality of user terminals is within a set time range.

19. The non-transitory computer-readable storage medium of claim 15, wherein the APP pushing method further comprises the following operations subsequent to obtaining all the identical communication numbers each of which exists in all the detected address books of the plurality of user terminals:
depending on an area range within which the plurality of user terminals are currently located, extracting from all the identical communication numbers a communication number matching the area range; and
pushing the preset APP and related information of the preset APP to a user terminal corresponding to the communication number matching the area range.

20. The non-transitory computer-readable storage medium of claim 19, wherein depending on the area range within which the plurality of user terminals are currently located, extracting from all the identical communication numbers the communication number matching the area range comprises:
depending on a plurality of areas where the obtained plurality of user terminals are currently individually located, determining the area range within which the plurality of user terminals are currently located; and
extracting from all the identical communication numbers the communication number matching the area range.

* * * * *